United States Patent [19]
Lehner et al.

[11] Patent Number: 5,618,012
[45] Date of Patent: Apr. 8, 1997

[54] SATELLITE STABILIZATION SYSTEM

[75] Inventors: John A. Lehner, Sunnyvale; Thomas Holmes, Portola Valley, both of Calif.

[73] Assignee: Space Systems/Loral, Inc., Palo Alto, Calif.

[21] Appl. No.: 371,821

[22] Filed: Jan. 12, 1995

[51] Int. Cl.⁶ .................................................. B64G 1/24
[52] U.S. Cl. .................................................. 244/168
[58] Field of Search .......................... 244/158 R, 164, 244/168, 173

[56] References Cited

U.S. PATENT DOCUMENTS

| | | | |
|---|---|---|---|
| 3,116,035 | 12/1963 | Cutler | 244/168 |
| 3,304,028 | 2/1967 | Dryden | 244/168 |
| 4,684,084 | 8/1987 | Fuldner et al. | 244/168 |
| 5,305,971 | 4/1994 | Decanini | 244/168 |
| 5,312,073 | 5/1994 | Flament et al. | 244/168 |

FOREIGN PATENT DOCUMENTS

| | | | |
|---|---|---|---|
| 2522614 | 9/1983 | France | 244/168 |
| WO90/06259 | 6/1990 | WIPO | |

*Primary Examiner*—Galen L. Barefoot
*Attorney, Agent, or Firm*—Perman & Green

[57] ABSTRACT

A satellite stabilization system compensates for the destabilizing torque introduced by solar radiation pressure by the emplacement of tabs of material angled relative to the back surfaces of the antenna reflectors to intercept solar rays. The material of the tabs interacts with the solar radiation in substantially the same manner as the interaction of the material on the back surface of each antenna reflector to produce a radiation pressure and consequential increment in a torque about an axis of the satellite. Each of the tabs is constructed in the manner of a plate or disk, and is attached by means of a spring mount to the back surface of one of the reflectors. The reflectors are angled relative to each other, as well as to a body of the satellite which holds feeds for illuminating the reflectors, for directing beams of radiation from the feeds towards the earth. Due to the angulation of the reflectors to each other, the total solar energy incident upon a pair of of the reflectors is generally unequal, this resulting in a net torque from the solar radiation pressure which tends to rotate the satellite. By virtue of the angulation of the tabs relative to the reflectors, an increased amount of solar radiation is received by the reflector which is angled away from the sun's rays, thereby to equalize the torque from both of the reflectors.

14 Claims, 5 Drawing Sheets

SATELLITE STABILIZATION SYSTEM

BACKGROUND OF THE INVENTION

This invention relates to stabilization of satellites, particularly communication satellites, having antenna reflectors disposed symmetrically about a body of the satellite for directing beams of radiation towards sites on the surface of the earth and, more particularly, to the symmetrical mounting of plates of material which may be absorptive and/or reflective of radiant energy mounted on the back surfaces of the antenna reflectors to reduce torques upon the satellite produced by solar radiation pressure, thereby to stabilize the satellite against rotation resulting from such torque.

Satellites are placed in orbit around the earth for a variety of purposes, including communication, determination of positions of vehicles traveling near and upon the earth's surface, and measuring geophysical phenomena including the photographing of cloud cover for weather forecasting. Generally, such satellites include a pair of relatively large antenna reflectors which are angled symmetrically about a central plane of symmetry extending through a body of the satellite, each reflector having a generally elliptical shape which, upon projection in the direction of the earth, appears as a circular radiator due to the angle of inclination of the reflector to the plane of symmetry.

Optimum performance of the satellite mission is obtained by maintaining the satellite with a predetermined orientation relative to the surface of the earth and the earth's axis. Therefore, it is common practice to provide a satellite with some means for detecting a deviation from the desired orientation, as well as a means for reorienting the satellite to correct for such deviation. Such systems for the maintenance of a desired satellite orientation may be referred to generally as a satellite stabilization system. The accuracy with which a stabilization system can maintain satellite orientation is dependent, in part, upon the magnitude of disturbing influences such as satellite rotation inducing torques introduced by solar pressure on antenna elements. By way of analogy with a ship tossed on stormy waves at sea, greater stability can be maintained in calm waters than in stormy waters. Similarly, in the case of satellites, a reduction in the magnitude of external solar forces which may disturb a satellite orientation result in a more accurate maintenance of a desired orientation by a satellite stabilization system.

A problem arises in that solar radiation pressure, developed upon surfaces of the satellite by radiation incident thereon, is a primary factor in introducing torques which tend to rotate a satellite resulting in a deviation of a satellite's orientation from a desired orientation. The severity of the problem is exacerbated by the inclined orientation of the antenna reflectors relative to the plane of symmetry. Due to the angulation of the reflectors to the plane of symmetry, incident solar radiation impinges upon each of the reflectors with different angles of incidence. By way of example, at a particular time of day, the backside of a reflector directed in a generally easterly direction may be substantially normal to incident solar radiation while the backside of a generally westerly directed reflector may be angled by 45°, 60° or even a greater angle of incidence to the incident solar radiation. Consequently, little solar radiation impinges on the westerly reflector.

The amount of differential angulation of the reflectors to the incident solar radiation depends on the specific design of the antennas, particularly with respect to the placement of feed elements on the body of the satellite relative to the front surfaces of the reflectors. As a result of the differential interception of the solar radiation by the two antenna reflectors, the total solar induced force on a reflector, as computed by integration of the solar pressure across the back surface of the reflector, is substantially greater for the reflector which is normal to the incident solar rays than for the solar induced force upon the reflector which is angled away from the incident solar radiation. Each of these forces introduces a torque about the body of the satellite. Since the forces differ in magnitude, the resulting torques differ in magnitude, this resulting in a net torque which tends to rotate the satellite away from the desired orientation away from the earth. The direction of the torque may change with time of day as the relative position of sun to satellite changes.

SUMMARY OF THE INVENTION

The aforementioned problem is overcome and other advantages are provided by a satellite stabilization system which compensates for the destabilizing torque introduced by the solar radiation pressure, in accordance with the invention, by the emplacement of tabs of material angled relative to the back surfaces of the antenna reflectors to intercept the solar rays. By analogy with the tabs employed in solar sailing, the tab of the invention which is disposed on the back side of an antenna reflector may be referred to as a dorsal tab. The material of the tabs interacts with the solar radiation in substantially the same manner as the interaction of the material on the back surface of each antenna reflector to produce a radiation pressure and consequential increment in a torque about an axis of the satellite. Each of the tabs is constructed in the manner of a plate or disk, and is attached by means of a spring mount to the back surface of one of the reflectors. Due to the angulation of the reflectors to each other, the angulation being provided for directing beams of radiation from feeds on the satellite body towards the earth, the total solar energy incident upon a pair of of the reflectors is generally unequal, this resulting in a net torque from the solar radiation pressure which tends to rotate the satellite about a rotational axis which may have components of yaw, pitch and roll. The yaw axis is a radius vector of the earth, the roll axis is perpendicular to the yaw axis and lies in a common plane with the earth's rotational axis, and the pitch axis is perpendicular to both the yaw and the roll axes. By virtue of the angulation of the tabs relative to the reflectors, an increased amount of solar radiation is received by the reflector which is angled away from the sun's rays, thereby to reduce a difference of the torques from the two reflectors.

The spring mounting of the tabs to the respective reflectors enables the tabs to be stowed with an orientation parallel to the reflector surfaces upon a stowage of the reflectors during a launching of the satellite aboard a launch vehicle. Upon deployment of the reflectors by release of the reflectors from their stowed position, a similar releasing of the tabs is provided for deployment of the tabs. By way of example, such releasing from the stowed position may be accomplished by means of explosive squibs which allow the tabs to deploy under spring pressure of their respective mounts to the desired orientations relative to the reflectors.

BRIEF DESCRIPTION OF THE DRAWING

The aforementioned aspects and other features of the invention are explained in the following description, taken in connection with the accompanying drawing figures, wherein.

Identically labeled elements appearing in different ones of the figures refer to the same element in the different figures.

DETAILED DESCRIPTION

Figure 1:
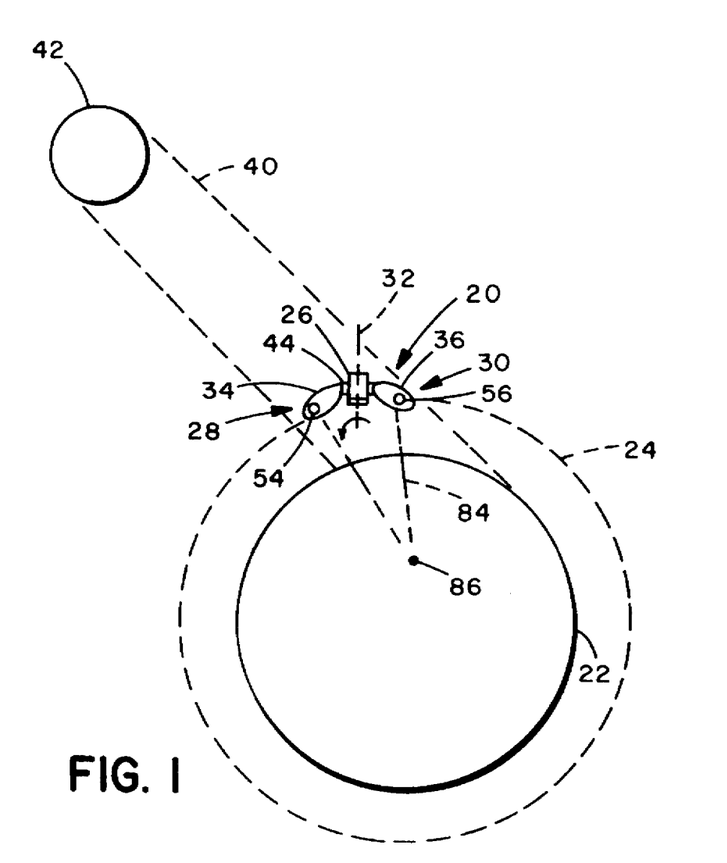
FIG. 1 is a stylized representation of a satellite encircling the earth in a geostationary orbit wherein, during a portion of the orbit, antenna reflectors of the satellite are illuminated by rays from the sun.

FIG. 1 shows a satellite 20 encircling the earth 22 along a path 24 of travel in a geosynchronous orbit about the earth 22. The satellite 20 comprises a body 26 having a first antenna 28 and a second antenna 30 which are disposed on opposite sides of the body 26 and positioned symmetrically about a roll axis 32 of the satellite 20. The antennas 28 and 30 include, respectively, reflectors 34 and 36 extending in substantially opposite directions from the axis 32, such as in easterly and in westerly directions, respectively. Rays 40 of radiation from the sun 42 are incident upon the satellite 20, including the body 26 and the back surfaces of the reflectors 34 and 36. The reflectors 34 and 36 are connected in well-known fashion to the body 26, as by means of struts 44 which maintain the reflectors 34 and 36 in the desired orientation relative to each other and to the body 26.

Figure 2:
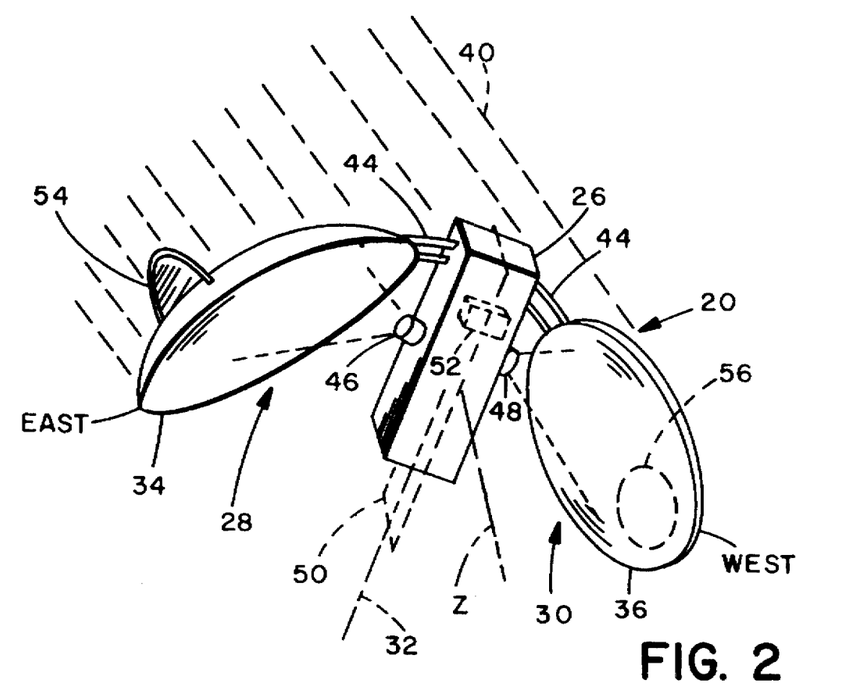
FIG. 2 is a stylized view of the satellite of FIG. 1 wherein the rays of solar radiation impinge primarily on the back surface of one of the reflectors while striking the other of the reflectors at a glancing angle.

FIG. 2 shows the satellite 20 with the reflectors 34 and 36 extending by the struts 44 from the body 26. In addition, the antennas 28 and 30 include feeds 46 and 48, respectively, mounted upon the body 26 and oriented for directing electromagnetic signals towards front surfaces of the reflectors 34 and 36. With reference to FIGS. 1 and 2, the reflector 34 of the antenna 28 may be regarded as the easterly reflector, and the reflector 36 of the antenna 30 may be regarded as the westerly reflector. As shown in FIG. 2, the direction of incidence of the suns rays 40 is such that the rays 40 are incident in a generally normal direction upon the back surface of the easterly reflector 34, but are incident in a glancing direction upon the back surface of the westerly reflector 36.

Figure 3:
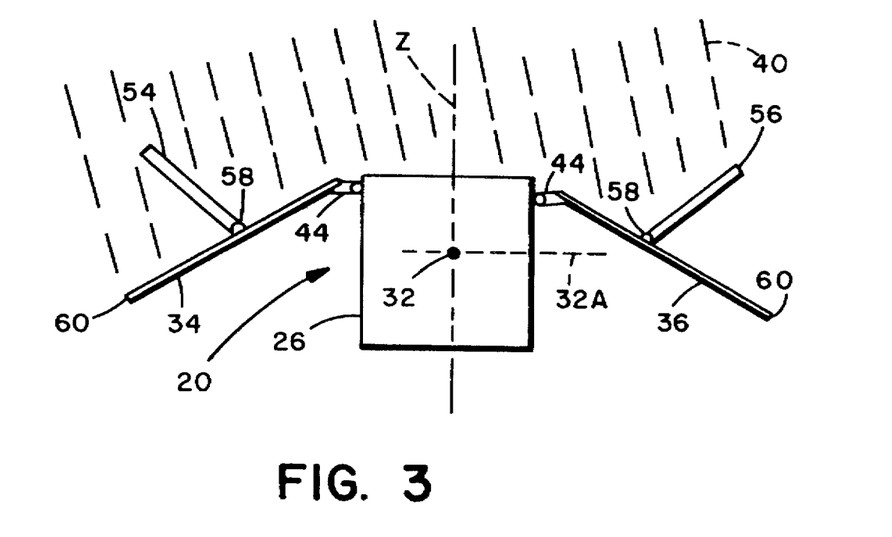
FIG. 3 is a simplified diagrammatic view of a satellite wherein the reflectors are portrayed as planar reflectors and tabs are portrayed in simplified view as planar tabs, the tabs being angled relative to the back surfaces of the respective reflectors for interception of rays of radiation in accordance with the invention.

The antennas 28 and 30 are positioned symmetrically about a central plane 50 extending through the body 26, and wherein the axis 32 (shown also in FIG. 1) is understood to lie within the plane 50. Yaw motion of the satellite 20 occurs about the Z axis which also lies in the central plane 50. The pitch axis 32A, shown in FIG. 3, is perpendicular to the roll and the yaw axes. Due to the inclination of the rays 40 relative to the central plane 50, with the consequential enlargement of the amount of radiation impacting upon the easterly reflector 34 as compared to the diminished amount of radiation impacting upon the westerly reflector 36, there is significantly greater radiation pressure upon the reflector 34 than upon the reflector 36.

Upon integrating the pressure along the entire back surface of each of the reflectors 34 and 36, the resultant force on the reflector 34 is substantially greater than the resultant force upon the reflector 36. This produces a net torque having components about the three axes Z, 32 and 32A. By way of example, the component of the torque inducing yaw about the Z axis is sometimes referred to as a wind mill torque. The radiation-induced torque varies in accordance with the time of day as the satellite 20 circulates about the earth 22 due to the change in angulation of the rays 40 relative to the satellite 20. The angulation of the rays 40 relative to the satellite 20 and the resulting torque vary also with the season of the year. The torque tends to destabilize the orientation of the satellite 20 relative to the earth 22. This makes it difficult for a well-known satellite pointing device 52 (indicated in phantom in FIG. 2) carried within the satellite body 26 to maintain a desired orientation of the satellite 20 relative to the earth 22.

Figure 4:
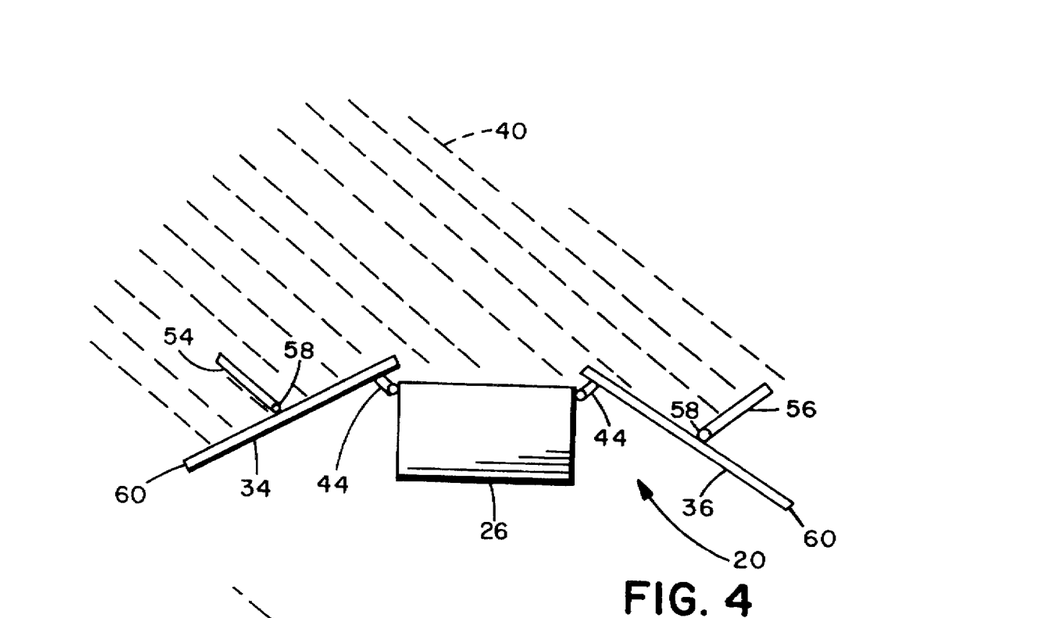
FIG. 4 is a view similar to that of FIG. 3, but demonstrating the impingement of solar rays at a glancing angle upon one of the reflectors with increased interception of the solar rays being provided by a tab extending from the reflector.

With reference to FIGS. 1, 2 and 3, and in accordance with the invention, the reflectors 34 and 36 comprise tabs 54 and 56 which are mounted respectively upon the back surfaces of the reflectors 34 and 36 by spring mounts 58, the latter being shown in FIG. 3. Each of the tabs 54 and 56 is constructed as a plate or disk which is flat in a preferred embodiment of the invention but, in accordance with the theory of the invention, may be curved if desired. As shown in FIGS. 3 and 4, the tabs 54 and 56 are angled relative to the back surfaces of the reflectors 34 and 36 so as to increase the amount of radiant energy incident upon the tab mounted to the reflector which is illuminated by the rays 40 at a glancing angle. The tabs 54 and 56 are portrayed in FIGS.

3 and 4, by way of example, as being angled at approximately 70 degrees relative to the back surface of their respective reflectors 34 and 36. The reflectors 34 and 36 are shown, by way of example, as being oriented at angles of approximately 30 degrees relative to a plane of the back surface of the body 26.

By way of example, as shown in FIG. 3, the back surface of the reflector 34 is illuminated with the rays 40 at an angle more nearly normal to the reflector surface than is the direction of illumination of the reflector 36. However, the orientations of the tabs 54 and 56 provide for illumination of the tab 56 with the rays 40 at an angle more nearly normal to the tab surface than is the direction of illumination at the surface of the tab 54. Thus, the construction of the reflectors 34 and 36 with the tabs 54 and 56 is effective to balance or more nearly balance the solar forces upon the reflectors 34 and 36 resulting from the radiation pressure. This balancing or approximate balancing of the solar forces reduces the amount of the destabilizing torque and, therefore, facilitates the task of the pointing device 52 (FIG. 2) in maintaining accurate orientation of the satellite 20 relative to the earth 22. In particular, the reduction in the destabilizing torque provided by the tabs 54 and 56 of the invention permits the pointing device 52 to provide for a substantially more accurate orientation of the satellite 20 relative to the earth 22.

FIG. 4 shows a diagrammatic representation of the satellite 20 which is similar to that of FIG. 3. However, in FIG. 4, the satellite 20 is so oriented relative to the incident solar rays 40 that the rays 40 substantially bypass the back surface of the reflector 36 while providing significant illumination of the back surface of the reflector 34. Herein, the angulation of the tab 56 relative to the back surface of the reflector 36 provides for interception of a significant amount of the rays 40. Thus, much of the radiation which would bypass the back surface of the reflector 36 is actually intercepted by the radiator 36 in view of the illumination of the tab 56. In contrast, in the case of the reflector 34 for which the back surface is illuminated at substantial normal incidence by the rays 40, the presence of the tab 54 has little if any effect upon the total amount of radiation upon the reflector 34. The increased illumination of the tab 56 tends to balance out the reduced illumination of the reflector 36, thereby to reduce the amount of differential torque contributions of the two reflectors 34 and 36.

FIGS. 3 and 4 show that the system of tabs 56 and 58 of the invention is effective to reduce the amount of destabilizing torque for differing amounts of inclination of the solar rays 40 relative to the satellite 20. The area of either one of the tabs 54 and 56 may be made equal to approximately 15% to 45% of the area of the back surface of the reflector 34 or 36, and the angle of inclination may be in the range of 45° to 90° between the tabs 54 or 56 and the back surfaces of the reflectors 34 or 36, respectively. The mount 58 may be placed midway between the strut 44 and the outer end 60 of the reflector 34 or 36, or preferably, closer to the outer end 60 than the mid point between the strut 44 (or nearest point of the body 26) and the outer end 60.

Figure 5:
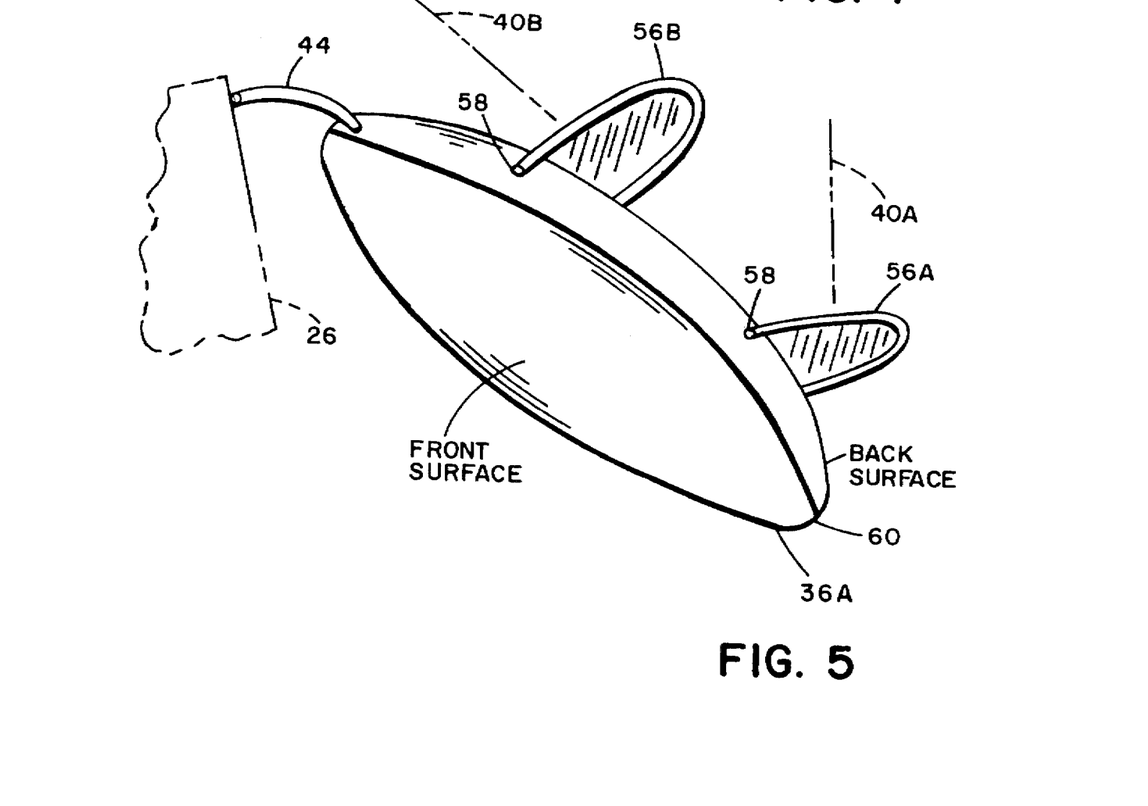
FIG. 5 is a stylized view of an arcuate reflector of the satellite provided with two planar tabs positioned for maximum interception of solar rays at different angles relative to a body of the spacecraft.
Figure 6:
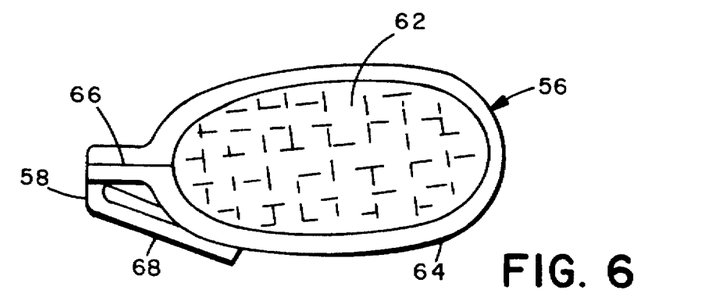
FIG. 6 is a perspective view of a preferred embodiment of a tab constructed of a frame of resilient material which supports a fabric, the fabric interacts with the solar rays to introduce a torque from solar radiation pressure, and the frame includes feet serving as a spring mount for mounting the tab upon the back surface of a reflector of the satellite in any one of FIGS. 1–5.
Figure 7:
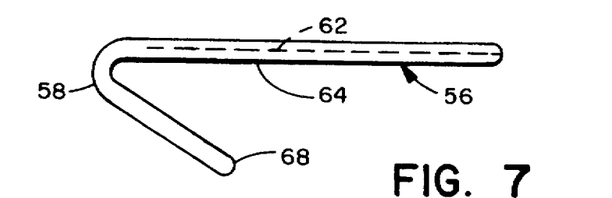
FIG. 7 is a side view of the tab of FIG. 6 showing the angled orientation of the feet of the frame relative to the surface of the fabric.
Figure 8:
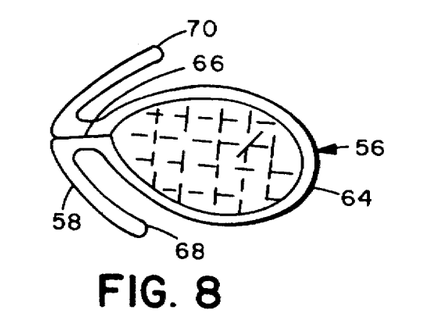
FIG. 8 is a plan view of the tab of FIG. 6 showing the diverging stance of the frame feet.

FIG. 5 shows an alternative embodiment of the invention wherein a reflector 36A is provided with two tabs 56A and 56B, the tab 56A being located nearer to the outer end 60 than the tab 56B. The configuration of the two tabs 56A and 56B is advantageous in the situation wherein the reflector 36A has a substantial curvature of its outer surface. For example, a solar ray 40A which might pass by the outer end 60 of the reflector 36A is intercepted by the tab 56A, while another solar ray 40B which is angled relative to the ray 40A would be caught by the tab 56B rather than being allowed to bypass the reflector 36A. The use of the two tabs 56A and 56B of FIG. 5 demonstrates the adaptability of the invention for reduction of the destabilizing torque in situations of differing orientations of the solar rays relative to the satellite.

FIGS. 6–10 show a preferred construction of a tab, such as the tab 56 wherein the tab comprises a fabric 62 which is held under tension by an encircling frame 64 of a lightweight flexible material having the characteristics of a spring. One such suitable material for the frame 64 is a fiberglass rod which is bent in the manner of a hoop around the fabric 62, and secured at 66, as by an adhesive, while the ends are splayed outward as feet 68 and 70 to provide for a secure mounting base upon the back surface of the reflector 36.

Figure 9:
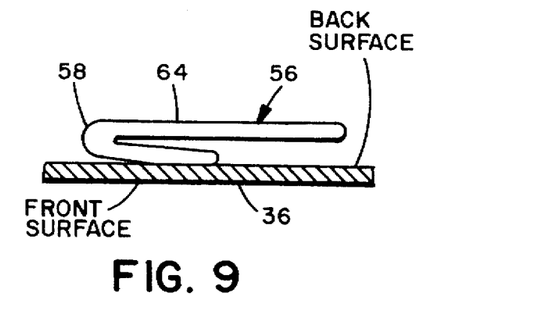
FIG. 9 shows a mounting of the tab of FIG. 6, shown in stowed position, to a back surface of the antenna reflector, shown in sectioned fragmentary view.
Figure 10:
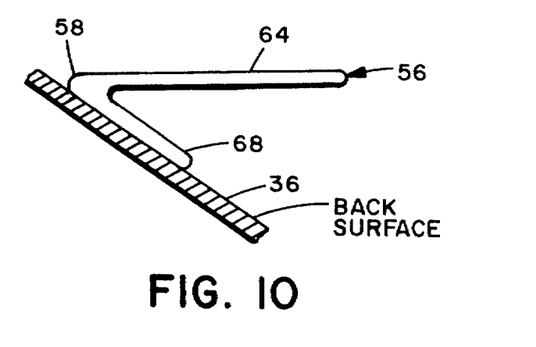
FIG. 10 is a view similar to that of FIG. 9 but showing the tab in a deployed position relative to the reflector.

FIG. 9 shows the generally parallel orientation of the tab 56 relative to the back surface of the reflector 36 during a stowage of the reflector 36, as may be done during a transporting of the satellite 20 in a launch vehicle prior to a launching of the satellite from the launch vehicle. FIG. 10 shows an inclined orientation of the tab 56 relative to the back surface of the reflector 36 upon deployment of the reflector 36.

Figure 11:
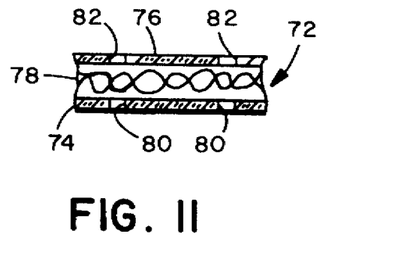
FIG. 11 is a fragmentary sectional view of a reflector of an antenna constructed with a honeycomb core.

The invention is useful independently of the specific materials used in constructing the reflector 36. To facilitate the description in FIGS. 9 and 10, the reflector 36 is shown as a metallic sheet which reflects radiant signals. However, preferably in the construction of satellite reflectors, it is advantageous to reduce the weight of the reflector by use of a honeycomb construction wherein the reflector is constructed as a laminate of honeycomb sandwiched between outer skins which form the front and the back surfaces of the reflector. Such a construction is shown in FIG. 11 wherein a fragmentary portion of a reflector 72 comprises front and back screens 74 and 76 enclosing a honeycomb core 78. The screens 74 and 76 may be perforated as shown by perforations 80 and 82. The screens 74 and 76, as well as the core 78, may be fabricated of graphite-epoxy fiber. The graphite-epoxy composition of the screen 74 provide an electrically conductive surface which serves as the front surface of the reflector 72 for transmitting radiant energy along a propagation path, such as a path 84 (FIG. 1) to a site 86 on the surface of the earth 22. These materials of the reflector 72 provide for thermal conductivity and little reradiation of the incident radiation. The fabric 62 of the tab 56 (FIG. 6) may be fabricated of a thin plastic material such as Mylar or Kevlar. The back surface of the reflectors 34 and 36 (FIGS. 1–3) are black, as is the surface of each of the tabs 54 and 56 so as to avoid reflection of incident light. Such construction of the antenna reflector provides for dimensional stability and light weight for optimum performance of the satellite. While a variety of materials may be employed in the construction of the tabs and the reflectors, it is preferable that the radiation absorption and reflectance of the tab approximate or equal the radiation absorption and reflectance of the back surface of the reflector.

Figures 12A, 12B, 12C:
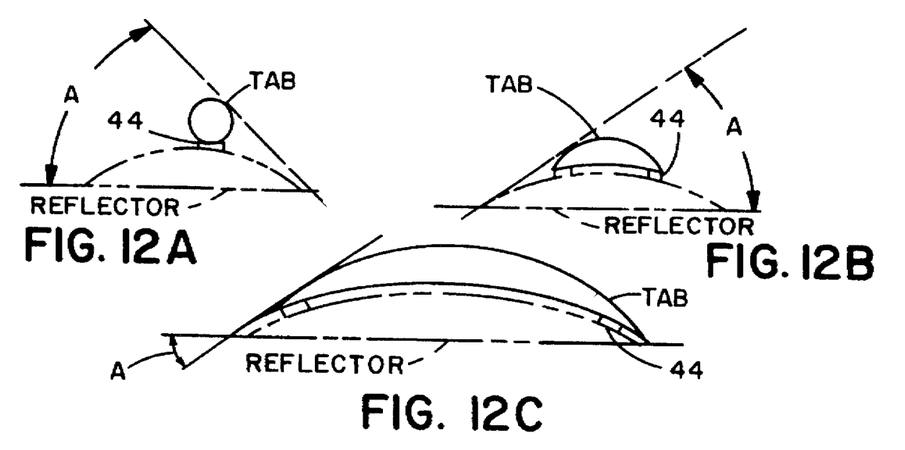
FIGS. 12A, 12B and 12C are diagrammatic plan views of alternative configurations of tabs mounted to elliptical antenna reflectors, shown in phantom, as viewed along a major axis of each of the reflectors.

FIGS. 12A, 12B and 12C show different configurations of the dorsal tab mounted by the struts 44 on the back surface of a reflector such as the reflector 34 or 36. With each configuration, it is advantageous to avoid generation of any additional shadowed area by the tabs upon a portion of the satellite. For example, the shadowing of cells of a solar panel (not shown) of the satellite 20 by a tab should be avoided to prevent electrical damage which might occur to the solar panel circuitry, and the shadowing of the body 26 by a tab should be avoided to prevent differential thermal expansion among portions of the body 26. Such additional shadowing can be avoided by constructing the tabs to fall within an envelope defined by the angle A between a chord of the reflector and a tangent line to a tab. For the geosynchronous orbit of the satellite 20, the angle A has a value of 23.5°. The tab of FIG. 12A has a circular shape, the tab of FIG. 12B has a generally circular sector shape, and the tab of FIG. 12C has a crescent shape. In each case, the tab is positioned along a centerline of the reflector.

Figure 13:
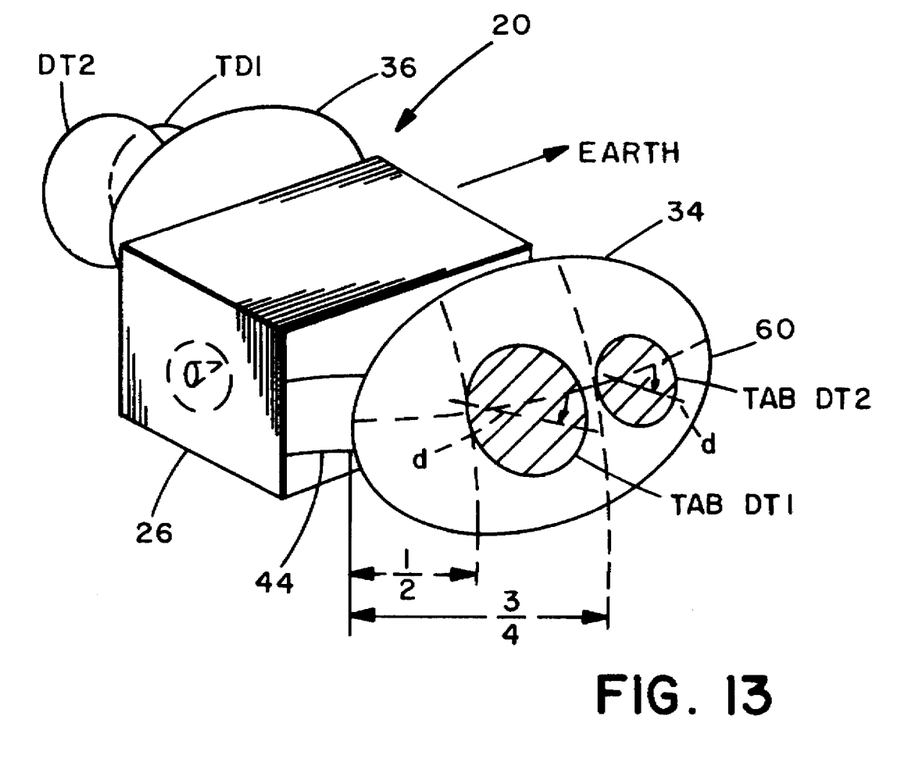
FIG. 13 is a stylized perspective view of a satellite with two circular tabs mounted upon each antenna reflector, in accordance with a preferred embodiment of the invention.
Figure 14:
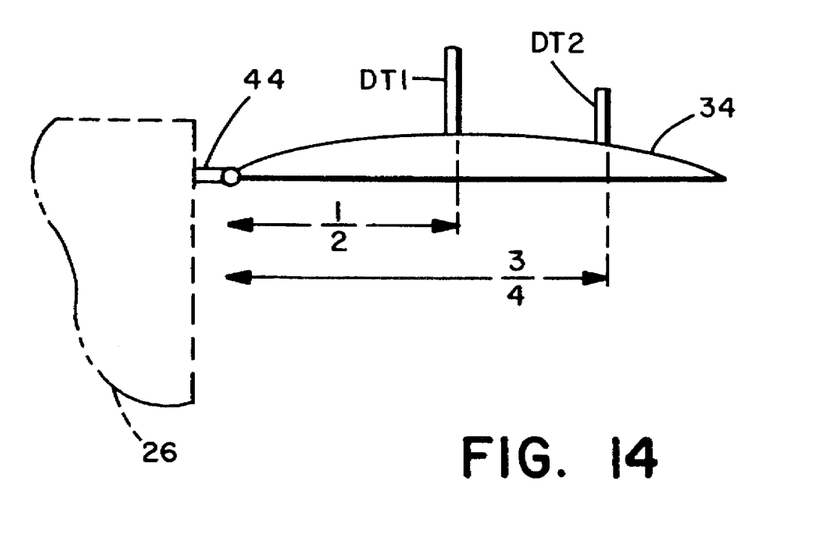
FIG. 14 is a diagrammatic side view of a reflector of FIG. 13 showing two tabs extending perpendicularly from a back surface of the reflector.

FIGS. 13 and 14 show a arrangement of plural tabs upon a reflector similar to that of FIG. 5. The arrangement of FIGS. 13 and 14 are in accordance with a preferred embodiment of the invention wherein two circular tabs of different diameter d are employed. The larger of the dorsal tabs, DT1, is centrally located upon the reflector 34, and the smaller dorsal tabs, DT2, is located near the outer end 60 of the reflector 34. The tabs are parallel to each other and are oriented at or approximately at 90° relative to the back surface of the reflector 34. The tab DT1 is located ½ of the distance from the strut 44 to the outer end 60, as shown in the drawing, and the tab DT2 is located ¾ of the distance from the strut 44 to the outer end 60. While only two tabs are shown, it is to be understood that the theory of the invention encompasses still further tabs if desired. The sum of the areas of the tabs DT1 and DT2 divided by the area of the reflector back surface provides a ratio of areas which, in the case of the preferred embodiment of the invention, is equal to 36%. As a result, the embodiment of the invention of FIGS. 13 and 14 has produced a reduction by a factor of one-half in the destabilizing torque introduced by the solar radiation pressure. This has enabled the pointing device 52 (FIG. 2) to reduce the error in satellite orientation by a factor of four. This shows that the invention is effective in increasing the accuracy with which a satellite can be oriented during its passage through an orbit about the earth.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. A satellite stabilization system for a satellite having a body and two opposed antenna elements disposed symmetrically on opposite sides of a plane of symmetry extending through the body, wherein each of said antenna elements has a first surface for directing radiant signals on a path between the satellite and the earth, each of said antenna elements has a second surface directed away from said first surface and positioned to intercept incident solar radiation during passage of the satellite along a path of travel around the earth, said second surface in each of said antenna elements interacting with the solar radiation to produce a solar radiation pressure along said second surface with a consequential torque about said body, the torque of each of said antenna elements depending on an orientation of said second surface of the antenna element relative to a direction of the incident solar radiation, the stabilization system comprising:

a first plate for intercepting solar rays, said first plate being mounted to the second surface of a first of said antenna elements;

a second plate for intercepting solar rays, said second plate being mounted to the second surface of a second of said antenna elements; and wherein said first plate and said second plate are oriented symmetrically about said plane of symmetry and angled relative to the second surfaces of the respective antenna elements to reduce a value of said torque.

2. A system according to claim 1 wherein each of said first and said second plates has an area in a range of approximately 15 percent to 45 percent of the area of the second surface of the respective one of said antenna elements.

3. A system according to claim 1 wherein each of said first and said second plates has an inclination in a range of approximately 45 degrees to 90 degrees relative to the second surface of the respective one of said antenna elements.

4. A system according to claim 1 wherein each of said first and said second plates is located more than half way between said body and an outer end of the second surface of the respective one of said antenna elements.

5. A system according to claim 1 wherein each of said antenna elements is a reflector, said body carries two antenna feeds directed towards the first surfaces of respective ones of said antenna elements, each of said first and said second plates has an area in a range of approximately 15 percent to 45 percent of the area of the second surface of the respective one of said antenna elements, each of said first and said second plates has an inclination in a range of approximately 45 degrees to 90 degrees relative to the second surface of the respective one of said antenna elements, and each of said first and said second plates is located more than half way between said body and an outer end of the second surface of the respective one of said antenna elements.

6. A system according to claim 1 further comprising a third plate of radiation absorptive material, said third plate being mounted to the second surface of said first of said antenna elements;

a fourth plate of radiation absorptive material, said fourth plate being mounted to the second surface of said second of said antenna elements; and wherein said third plate and said fourth plate are oriented symmetrically about said plane of symmetry and angled relative to the second surfaces of the respective antenna elements to reduce a value of said torque.

7. A system according to claim 6 wherein said third plate is located between said first plate and an outer end of said first antenna element, and said fourth plate is located between said second plate and an outer end of said second antenna element.

8. A system according to claim 1 wherein a mounting of each of said plates to the respective one of said antenna elements is accomplished by a spring mounting allowing movement of a plate between a stowed position and a deployed position.

9. A system according to claim 1 wherein each of said plates comprises a fabric and a frame which encircles the fabric and holds the fabric taut.

10. A system according to claim 9 wherein, in each of said plates, said frame is formed of a flexible material and comprises feet for mounting the plate to one of said antenna elements by a spring mount.

11. A system according to claim 1 wherein each of said plates comprises a material which is absorptive of solar radiation.

12. A system according to claim 1 wherein each of said plates comprises a material which is reflective of solar radiation.

13. A system according to claim 1 wherein each of said plates comprises a material which has characteristics of solar radiation absorption and reflectance approximating characteristics of solar radiation absorption and reflectance of the second surface of one of said antenna elements.

14. A method of stabilizing orientation of a satellite relative to the earth, the satellite having a body and two opposed antenna elements disposed symmetrically on opposite sides of a plane of symmetry extending through the body, wherein each of said antenna elements has a first surface for directing radiant signals on a path between the satellite and the earth, each of said antenna elements has a second surface directed away from said first surface and positioned to intercept incident solar radiation during passage of the satellite along a path of travel around the earth, said second surface in each of said antenna elements interacting with the solar radiation to produce a solar radiation pressure along said second surface with a consequential torque about said body, the torque of each of said antenna elements depending on an orientation of said second surface of the antenna element relative to a direction of the incident solar radiation, the method comprising:

mounting a first plate to the second surface of a first of said antenna elements for intercepting solar radiation;

mounting a second plate to the second surface of a second of said antenna elements for intercepting solar radiation; and orienting said first plate and said second plate symmetrically about said plane of symmetry and angling said plates relative to the second surfaces of the respective antenna elements to reduce a value of said torque.

* * * * *